United States Patent [19]
Selley et al.

[11] Patent Number: 6,107,399
[45] Date of Patent: Aug. 22, 2000

[54] SILICONE RELEASE AGENT AND METHOD

[75] Inventors: David Brian Selley; Dipak Narula; Anh Be, all of Midland, Mich.

[73] Assignee: Dow Corning Corporation, Midland, Mich.

[21] Appl. No.: 08/287,552

[22] Filed: Aug. 8, 1994

Related U.S. Application Data

[62] Division of application No. 08/201,517, Feb. 24, 1994, Pat. No. 5,900,459.

[51] Int. Cl.$^7$ ........................................ C08L 83/00
[52] U.S. Cl. .......................... 524/837; 524/317; 524/346; 524/375; 524/831
[58] Field of Search ..................................... 524/317, 376, 524/375, 831, 837, 888; 427/387

[56] References Cited

U.S. PATENT DOCUMENTS

| | | | |
|---|---|---|---|
| 4,209,432 | 6/1980 | Roth | 260/29.2 |
| 4,478,911 | 10/1984 | Price | 428/332 |
| 5,205,860 | 4/1993 | Narula et al. | 106/2 |

*Primary Examiner*—Helen L. Pezzuto
*Attorney, Agent, or Firm*—James L. De Cesare

[57] ABSTRACT

A method of improving the release and antideposition characteristics of a hard impermeable surface. A hard impermeable surface is coated with a film of an aqueous solution. The solution is formed by combining (i) a dimer of at least two alkoxy functional silanes, (ii) an aqueous silicone emulsion of a polydiorganosiloxane, and (iii) water. The film is allowed to dry on the hard impermeable surface or the film can be wiped to dryness. The solution may also contain a water soluble hydrophilic solvent such as propylene glycol.

6 Claims, No Drawings

SILICONE RELEASE AGENT AND METHOD

This is a divisional of application Ser. No. 08/201,517 filed on Feb. 24, 1994, now U.S. Pat. No. 5,900,459.

BACKGROUND OF THE INVENTION

This invention is directed to a silicone release agent which can be used on hard impermeable surfaces. The release agent is in the form of an aqueous solution containing an alkoxy functional silicone dimer, and a silicone emulsion.

Release agents are substances which control or eliminate the adhesion between two surfaces. Such agents are also known under a variety of terms such as antideposition aids, adherents, antistick agents, surface lubricants, and parting agents.

Release agents are available as neat liquids, solvent solutions, emulsions, and dispersions, and can be applied by standard coating methods such as brushing, dipping, or spraying, techniques. Their primary function is to reduce the accumulation of many different substances on various surfaces. Typically, a synthetic polymer is employed, and some common examples are the use of polyolefins for refrigerator ice trays, fluorocarbon treated cookware, and silicone treated metal baking dishes and pans.

According to the present invention, a novel silicone composition is provided, which has been found to possess the capability of imparting to hard impermeable surfaces, an improved appearance and excellent release characteristics. As a hard surface protectant, the composition allows easier cleaning of impermeable surfaces such as appliances, countertops, and siding, for example.

SUMMARY OF THE INVENTION

The invention relates to a silicone containing release agent or antideposition aid which is useful on a wide variety of hard impermeable surfaces. The purpose of the instant silicone antideposition aid is to facilitate the removal of objects or undesirable deposits from the hard impermeable surface to which it has been applied.

It has particular application to the front end of motor vehicles, especially on the grill area and the front bumper parts, where road grime, bug accumulation, and dirt buildup, are prevalent. Application of the release agent of the invention to these parts makes subsequent cleaning of the parts much easier.

These and other features, objects, and advantages of the present invention will become more apparent from a consideration of the following detailed description thereof.

DETAILED DESCRIPTION OF THE INVENTION

The invention is directed to a silicone release agent and to a method of using the silicone release agent for improving the release characteristics of a hard impermeable surface.

The method according to the present invention is practiced by coating the hard impermeable surface with a film of an aqueous solution. The aqueous solution is formed by combining (i) a dimer of at least two alkoxy functional silanes, (ii) an aqueous silicone emulsion of a polydiorganosiloxane which is made either mechanically or by emulsion polymerization using nonionic, anionic, or cationic surfactants, but which is most preferably an aqueous silicone emulsion of an anionically stabilized hydroxylated polydiorganosiloxane, and (iii) water. The solution can be sprayed or wiped on the surface, and then the surface is wiped dry or the film can be allowed to dry on the surface.

The aqueous solution contains from 1 to 5 percent by weight of the dimer, and from 1 to 5 percent by weight of the polydiorganosiloxane. The total water content of the solution is about 60 to 98 percent by weight, including the amount of water in the emulsion. The aqueous solution may further contain from 1 to 30 percent by weight of a water soluble hydrophilic organic solvent. Preferably, the solution contains 15 to 20 percent by weight of the water soluble hydrophilic organic solvent.

One of the alkoxy functional silanes used to form the dimer is an alkyltrialkoxysilane having $C_1$ to $C_6$ alkyl groups on silicon. Representative compounds of this category are methyltrimethoxysilane, ethyltrimethoxysilane, propyltrimethoxysilane, isopropyltrimethoxysilane, butyltrimethoxysilane, isobutyltrimethoxysilane, pentyltrimethoxysilane, and hexyltrimethoxysilane. The alkyltriethoxysilanes corresponding to the alkyltrimethoxysilanes mentioned are also especially useful.

The other alkoxy functional silane used to form the dimer is a silane coupling agent which has the formula $X_3Si(CH_2)_nY$ in which n has a value of zero to three, X is a hydrolyzable group on silicon, and Y is a reactive organofunctional group. Representative compounds of this category are N-(2-aminoethyl)-3-aminopropyltrimethoxysilane, N-(aminoethylaminomethyl)phenyltrimethoxysilane, N-(2-aminoethyl)-3-aminopropyltris(2-ethylhexoxy)silane, 3-aminopropyltrimethoxysilane, trimethoxysilylpropyldiethylenetriamine, propylmethylmethylphosphonate trimethoxysilane, sodium (trihydroxysilyl) propylmethylphosphonate, and bis(2-hydroxyethyl)-3-aminopropyltrimethoxysilane.

In addition to these silane coupling agents, there may also be employed quaternary functional silanes. These quaternary functional silanes are compounds having one of the formulas shown below:

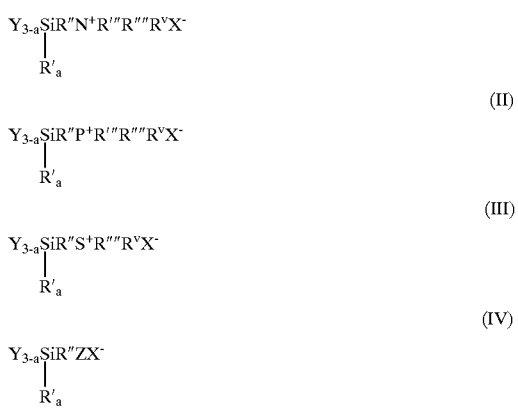

In each of the Formulas (I)–(IV), Y is R or RO in which R is an alkyl radical of one to four carbon atoms or hydrogen; a has a value of zero, one or two; R' is a methyl or ethyl radical; R'' is an alkylene group of one to four carbon atoms; R''', R'''' and $R^V$ are each independently selected from the group consisting of alkyl radicals of one to eighteen carbon atoms, $-CH_2C_6H_5$, $-CH_2CH_2OH$, $-CH_2OH$, and $-(CH_2)_xNHC(O)R^{vi}$ in which x has a value of from two to ten and $R^{vi}$ is a perfluoroalkyl radical having from one to twelve carbon atoms; X is chloride, bromide, fluoride, iodide, acetate or tosylate; and Z is a positively charged aromatic pyridinium ring of the formula $C_5H_6N^+$.

R in the above formulas are alkyl groups of one to four carbon atoms. Thus, useful as R are methyl, ethyl, propyl, and butyl radicals. Y can also be RO in which R is an alkyl group as noted, or hydrogen indicating the silanol form, i.e. the hydrolyzate. The value of a is zero, one or two, and R' is a methyl or ethyl radical.

R" is an alkylene group of one to four carbon atoms. Thus, R" can be alkylene groups such as methylene, ethylene, propylene, and butylene. R''', R'''' and R$^v$ are each independently an alkyl radical of one to eighteen carbon atoms, —CH$_2$C$_6$H$_5$, —CH$_2$CH$_2$OH, —CH$_2$OH, or —(CH$_2$)$_x$NHC(O)R$^{vi}$. The integer x has a value of from two to ten, and R$^{vi}$ is a perfluoroalkyl radical having from one to twelve carbon atoms. The substituent X is chloride, bromide, fluoride, iodide, acetate or tosylate. Z is a positively charged aromatic pyridinium ring of the formula C$_5$H$_6$N$^+$—.

Preferred compounds are the quaternary ammonium functional silanes of the formula:

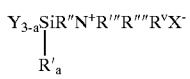

in which R is methyl or ethyl; a has a value of zero; R" is propylene; R''' is methyl or ethyl; R'''' and R$^v$ are alkyl groups containing one to eighteen carbon atoms, wherein at least one such group is larger than eight carbon atoms; and X is either chloride, acetate or tosylate.

Specific examples of representative quaternary functional silanes are compounds having the following formulas:

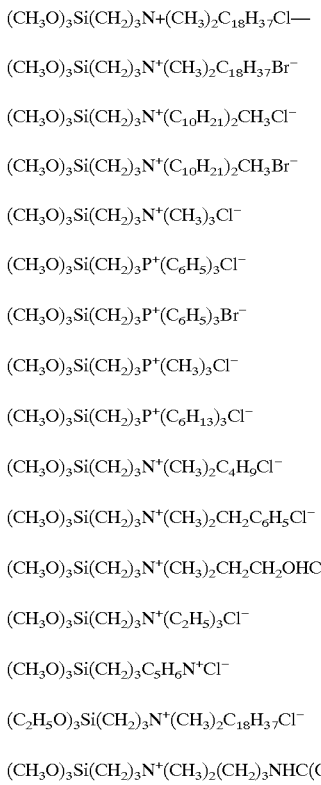

One especially preferred species of quaternary ammonium functional silane having a structure corresponding to Formula (I) is the compound 3-(trimethoxysilyl)propyldimethyloctadecyl ammonium chloride, which is referred to as "TMS" for the sake of simplicity. "TMS" has the structure:

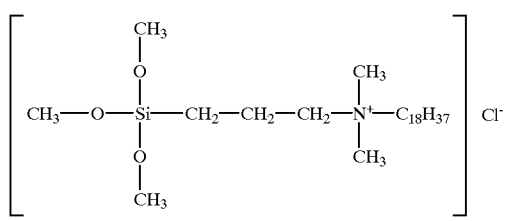

Methods of making quaternary ammonium functional silanes are known in the art and involve the reaction of chloroalkyltrimethoxysilanes and tertiary amines. For example, the silane "TMS" shown above can be prepared as follows:

(MeO)$_3$SiCH$_2$CH$_2$CH$_2$Cl+C$_{18}$H$_{37}$NMe$_2$→C$_{18}$H$_{37}$N$^+$(Me)$_2$CH$_2$CH$_2$CH$_2$Si(OMe)$_3$Cl$^-$.

In those instances where it is desired to include a water soluble hydrophilic organic solvent in the solution as an ingredient, suitable categories of compounds which may be employed are polyhydric alcohols, glycol ethers, or polyethylene glycols.

Representative water soluble hydrophilic solvents which can be used are ethylene glycol, propylene glycol, ethylene glycol n-butyl ether, ethylene glycol phenyl ether, diethylene glycol methyl ether, diethylene glycol n-butyl ether, propylene glycol methyl ether, propylene glycol methyl ether acetate, dipropylene glycol methyl ether acetate, propylene glycol n-butyl ether, propylene glycol phenyl ether, dipropylene glycol methyl ether, dipropylene glycol n-butyl ether, and tripropylene glycol methyl ether.

The glycol ethers noted above are available on a commercial basis from The Dow Chemical Company, Midland, Mich., under the trademark DOWANOL®.

The silicone emulsion includes a dispersed phase which is the polydiorganosiloxane and a continuous phase of water. Nonionic, anionic, or cationic surfactants can be used to make the silicone emulsion. The silicone emulsion can be made mechanically or it can be made by emulsion polymerization. The most preferred silicone emulsion according to the invention is the anionic silicone emulsion described in detail in U.S. Pat. No. 4,221,688, issued Sep. 9, 1980, which is incorporated herein by reference. Generally, the emulsion has a pH in the range of 9 to 11.5, and includes a continuous phase which is water, and a dispersed phase which is an anionically stabilized hydroxylated polydiorganosiloxane and a colloidal silica.

The silicone polymer of the emulsion is a linear species having an average of about two silicon bonded hydroxyls per molecule. These polymers have a weight average molecular weight of at least about 5,000 and up to about 1,000,000, but preferably in the range of 200,000 to about 700,000.

Anionic surfactants including alkali metal salts of sulfonic acid are employed, and nonionic emulsifying agents may be used in conjunction with the anionic surfactant, although the presence of a nonionic emulsifier is not a requirement. This silicone emulsion forms an elastomeric product upon removal of water under ambient conditions. More desirable elastomeric products can be obtained by including in the emulsion a diorganotindicarboxylate such as dioctyltindilaurate.

The emulsion may contain from 1 to 80 percent by weight of the dispersed phase, and from 20 to 99 percent by weight of the continuous phase. Preferably, the emulsion contains from 25 to 60 percent by weight of the dispersed phase, and from 30 to 75 percent by weight of the continuous phase.

The dimer of the two alkoxy functional silanes and methods of preparing the dimer are described in detail in U.S. Pat. No. 5,205,860, issued Apr. 27, 1993, which is incorporated herein by reference. For instance, in Example I of the '860 patent, a dimer was prepared by combining 2.7 moles of methyltrimethoxysilane, 1.4 moles of N-(2-aminoethyl)-3-aminopropyltrimethoxysilane, and 1.8 moles of water. Stripping of methanol yielded a dimer which was stable upon dilution in water.

The silicone release agent of the invention can be applied to various hard impermeable surface made of materials such as metal, glass, plastic, painted surfaces, glazed tile, and formica. Specific areas of application of the silicone release agent can include chrome vehicle parts such as bumpers and grills, painted vehicle surfaces and parts, windows, furniture, siding, paneling, countertops, appliances, bathroom and kitchen tiles, toilet bowls, sinks, bathtubs, showers, drainboards, containers, trays, metal parts, and metal plates.

Generally, the silicone release agent can be applied to any hard impermeable surface where it is desired to impart to the surface an easy to clean nonstick surface. After the silicone release agent has been applied to the surface by spraying or rubbing, and wiped or allowed to dry, the treated surface is easier to clean and does not require as much scouring, scraping, or soaking. Treated surfaces contain a slick surface which stays cleaner longer and maintenance is easier. A practical use of the silicone release agent is for the treatment of the front areas of an automobile to facilitate the cleaning of bugs, dirt, and road grime.

The invention is further illustrated in more detail in the following examples.

EXAMPLE I

A release agent according to the present invention was prepared by using a "dimer" of two alkoxy functional silanes. This "dimer" was prepared according to Example I in U.S. Pat. No. 5,205,860 by combining 2.7 moles of methyltrimethoxysilane, 1.4 moles of N-(2-aminoethyl)-3-aminopropyltrimethoxysilane, and 1.8 moles of water. Stripping of methanol yielded a stable product.

EXAMPLE II

Three parts of the "dimer" prepared in Example I above, were combined with 94 parts of water and then three parts of the anionic silicone emulsion described in U.S. Pat. No. 4,221,688. The dispersed phase of the emulsion contained an anionically stabilized hydroxylated polydiorganosiloxane having a weight average molecular weight of about 140,000. The dimer, water, and the anionic silicone emulsion were blended together to form a homogeneous release agent.

EXAMPLE III

The release agent of Example II was applied to the surface of a clean, acrylic clear-coated, dark blue automotive paint panel by wiping with an absorbent cloth. The surface was wiped dry with an absorbent cloth. The treated area of the painted panel was observed to be significantly slicker in feeling, without being wet or oily, when compared to a portion of the painted panel which was left untreated. It was also noted that the surface was more glossy but not smeary or greasy.

EXAMPLE IV

A release agent similar to that of Example II was prepared, except that the water portion was 74 parts, and 20 parts of propylene glycol was added after the addition of the silicone emulsion and before final blending. This mixture also yielded a stable release agent.

EXAMPLE V

The release agent of Example IV was applied by spraying with a pump sprayer and wiping-to-dry with an absorbent cloth, onto the cleaned front bumper, hood and grill surfaces, of a late-model Dodge minivan but the driver side of the minivan was left untreated. The passenger side was treated. The tactile feel of the treated surfaces was much smoother and more slippery in feeling than that of the untreated surfaces. The appearance of the treated portion was also improved over that of the untreated portion in that it appeared cleaner and more glossy. The vehicle was driven approximately 2000 miles over the next three weeks, and then the front surfaces were evaluated for soiling and ease of cleaning. It was observed that there was little discernible difference in the level of soiling or insect stains between the treated and untreated portions, but there was a significant difference in the ease of removal of the soil and insect stains between the treated and untreated portions. The portion which was untreated required hard scrubbing with a detergent solution and frequent rinsing, to effectively remove the accumulated soils. By contrast, the treated portion was easily cleaned with a dry cloth and with a damp cloth in heavily soiled areas. After the detergent washing, there was still a perceivable difference in the feel of the treated portion as compared to the untreated portion.

EXAMPLE VI

The release agent described in Example IV was applied to a clean glass mirror by spraying with a pump sprayer, allowing it to stand for approximately one minute, and wiping dry. A portion of the mirror was left untreated for comparison purposes. It was observed that the treated portion of the mirror had a smoother, more slippery feel than the untreated portion, and that there were no apparent smears or streaks on either portion. Drops of red pigmented water were deposited on the treated and untreated portions of the mirror, and allowed to dry overnight. The resulting stains were removed by wiping away with a dry cloth, and it was observed that the treated portion was much easier to clean than the untreated portion. Furthermore, it was noticed that the drag on the cloth used to clean the surface was significantly less when cleaning the treated portion as compared to the untreated portion.

EXAMPLE VII

Several drops of hard well water were placed on the treated and untreated surfaces of the mirror of Example VI and allowed to dry. It was noticed on application of the water droplets, that the observed contact angle of the water was significantly higher on the treated surface than on the untreated surface. On drying, the residue was removed by wiping with a clean absorbent cloth, and it was observed that the residue was much easier to remove from the treated surface than from the untreated surface. It was further observed that the residue was difficult to remove from the untreated surface even when using a damp cloth with repeated scrubbing.

EXAMPLE VIII

A release agent similar to that in Example II was prepared, except that the aqueous silicone emulsion was about 50 percent of a mechanically emulsified silicone fluid of about 60,000 centistokes in a continuous phase of water using nonionic and anionic surfactants. A blend made by combining 3 parts of the emulsion, 94 parts water, and 3 parts of the dimer formed a homogeneous release agent.

EXAMPLE IX

The release agent of Example VIII was applied to the surface of a clean acrylic clear-coated, dark blue automotive paint panel by wiping with an absorbent cloth. The treated area of the painted panel was observed to be significantly slicker in feeling without being wet or oily, when compared to portions of the same painted panel which was untreated. It was also noted that the surface was more glossy but not smeary or greasy.

Other variations and modifications may be made in the compounds, compositions, and methods described herein, without departing from the essential features and concepts of the present invention. The forms of the invention are exemplary only and are not intended as limitations on the scope of the invention as defined in the appended claims.

What is claimed is:

1. A release agent for improving the release and antideposition characteristics of a hard impermeable surface comprising an aqueous solution formed by combining (i) 1–5% by weight of a dimer of at least two alkoxy functional silanes, (ii) an aqueous silicone emulsion of a polydiorganosiloxane, the solution including 1–5% by weight of the polydiorganosiloxane, (iii) the total content of water in the solution being 60–98% by weight including the water of the emulsion; and (iv) 1–30% by weight of a water soluble hydrophilic organic solvent selected from the group consisting of ethylene glycol, propylene glycol, ethylene glycol n-butyl ether, ethylene glycol phenyl ether, diethylene glycol methyl ether, diethylene glycol n-butyl ether, propylene glycol methyl ether, propylene glycol methyl ether acetate, dipropylene glycol methyl ether acetate, propylene glycol n-butyl ether, propylene glycol phenyl ether, dipropylene glycol methyl ether, dipropylene glycol n-butyl ether, and tripropylene glycol methyl ether.

2. A release agent according to claim 1 in which one of the alkoxy functional silanes is an alkyltrialkoxysilane having $C_1$ to $C_6$ alkyl groups on silicon.

3. A release agent according to claim 2 in which the alkyltrialkoxysilane is a compound selected from the group consisting of methyltrimethoxysilane, ethyltrimethoxysilane, propyltrimethoxysilane, isopropyltrimethoxysilane, butyltrimethoxysilane, isobutyltrimethoxysilane, pentyltrimethoxysilane, and hexyltrimethoxysilane.

4. A release agent according to claim 2 in which the other alkoxy functional silane is a silane coupling agent having the formula $X_3Si(CH_2)_nY$ in which n has a value of zero to three, X is a hydrolyzable group on silicon, and Y is a reactive organofunctional group.

5. A release agent according to claim 4 in which the silane coupling agent is a compound selected from the group consisting of N-(2-aminoethyl)-3-aminopropyltrimethoxysilane, N-(aminoethylaminomethyl) phenyltrimethoxysilane, N-(2-aminoethyl)-3-aminopropyltris(2-ethylhexoxy)silane, 3-aminopropyltrimethoxysilane, trimethoxysilylpropyldiethylenetriamine, propylmethylmethylphosphonate trimethoxysilane, sodium (trihydroxysilyl) propylmethylphosphonate, and bis(2-hydroxyethyl)-3-aminopropyltrimethoxysilane.

6. A release agent according to claim 1 in which the solution includes 15 to 20 percent by weight of the water soluble hydrophilic organic solvent.

* * * * *